March 31, 1970 F. T. THOMPSON 3,504,196

AMPLIFYING APPARATUS OPERABLE TO TWO STABLE OUTPUT STATES

Filed June 16, 1967

WITNESSES:

Bernard R. Gieguez

James F. Young

INVENTOR

Francis T. Thompson

BY Clement J. Paznokas

ATTORNEY

United States Patent Office 3,504,196
Patented Mar. 31, 1970

3,504,196

AMPLIFYING APPARATUS OPERABLE TO TWO STABLE OUTPUT STATES

Francis T. Thompson, Verona, Pa., assignor to Westinghouse Electric Corporation, Pittsburgh, Pa., a corporation of Pennsylvania Filed June 16, 1967, Ser. No. 646,672
Int. Cl. H03k *17/00*
U.S. Cl. 307—248 22 Claims

ABSTRACT OF THE DISCLOSURE

In the amplifier apparatus shown, a first electronic amplifier selectively operable in mutually exclusive first and second modes in response to respective mutually exclusive first and second operating conditions, drives a second electronic amplifier that is operable in either of two modes depending on the mode of the first amplifier. The second amplifier, depending on its mode, drives a switch to one or the other of two states. The amplifiers switch from the first mode to the second mode in response to an input signal having a first predetermined requirement, and back to the first normal mode in response to an input signal with a second predetermined requirement separated from the first predetermined minimum requirement by hysteresis. To accelerate the change from first to second modes, regenerative feedback is supplied from the second amplifier to the first amplifier through two parallel paths, one bidirectional, the other unidirectional and poled to pass regenerative feedback current and to block current in the direction which would tend to alter the value of the first predetermined requirement. Resistance of the unidirectional path may be varied to vary the second predetermined requirement and hysteresis independently of the first requirement. The first and second modes of the amplifiers correspond, by way of example, to "dropped out" and "picked up" modes of an electromagnetic relay. These modes may also be termed "reset" and "set" modes or states. Various means are illustrated to supply the input signals with the first and second predetermined requirements to the first amplifier in response to switches and conditions such as voltage, temperature, etc.

BACKGROUND OF THE INVENTION

The invention relates to an electronic amplifier for providing selectable set and reset output states, and more particularly to such amplifiers for use in relay apparatus. Circuits involving cascaded electronic amplifiers with regenerative feedback therebetween to provide snap action and latching when changing from reset to set have been previously proposed. The feedback circuit is a factor in determining the value of the input signal required to initiate reset (drop-out voltage or reset point). Generally, elements of the feedback circuit are also in paths that affect the bias that holds the apparatus in the reset or dropped-out state. In such arrangement, changes in the parameters of the feedback circuit will often change the pull-in voltage value (set point or input signal value required to change from reset to set states). It is desirable to be able to change the value of the dropout voltage (reset point), without affecting the value of pull-in voltage (set point).

SUMMARY OF THE INVENTION

One aspect of the present invention is directed to amplifying apparatus with two parallel regenerative feedback paths between first and second electronic amplifiers one path being bidirectional, the other unidirectional to permit the flow of regenerative feedback current and to block flow of current in a direction that would affect the bias on the first amplifier in such manner as to change the set point or pull-in voltage value i.e. the signal required to switch the amplifying apparatus from reset to set states. The reset point of the apparatus may be changed without affecting the set point by changing current controlling parameters of the unidirectional feedback path. If the polarity of the unidirectional path is reversed, the set point of the apparatus may be charged without affecting the reset point by adjusting the parameters of the unidirectional feedback path.

Other aspects of the invention contemplate an electronic amplifying system wherein the input amplifier is a differential amplifier employing two electron valves driveable by each other, one of the valves driving a second amplifier that supplies regenerative feedback to the input amplifier. One valve of the input amplifier is normally biased by means including a voltage divider connected across a pair of DC supply lines, and with a tap of the voltage divider connected to the control electrode of the valve. Response to a switching device is obtained by connecting a switching device between one of the supply lines and the control electrode of one of the valves. The switching device may for example be mechanically operated contacts, or a voltage threshold device such as a Zener diode.

Accordingly it is an object of the invention to provide improved amplifying apparatus that provides two stable output states.

Another object is to provide a simple and effective arrangement for adjusting the hysteresis in a latching feedback type amplifier.

Another object is to provide a simple and effective arrangement for adjusting the reset point of a latching feedback type amplifier without affecting the set point of the amplifier.

Another object is to provide a simple and effective arrangement for adjusting the set point of a latching feedback type amplifier without affecting the reset point of the amplifier.

A further object is to provide an improved arrangement for controlling a differential amplifier in response to a switching device.

Other and further objects and advantages will become apparent from the following detailed description taken in conjunction with the drawings wherein preferred embodiments of the invention are illustrated.

DESCRIPTION OF THE PREFERRED EMBODIMENT

Figures 1, 2, 3, 4, 5, 6, 7, 8, 9:
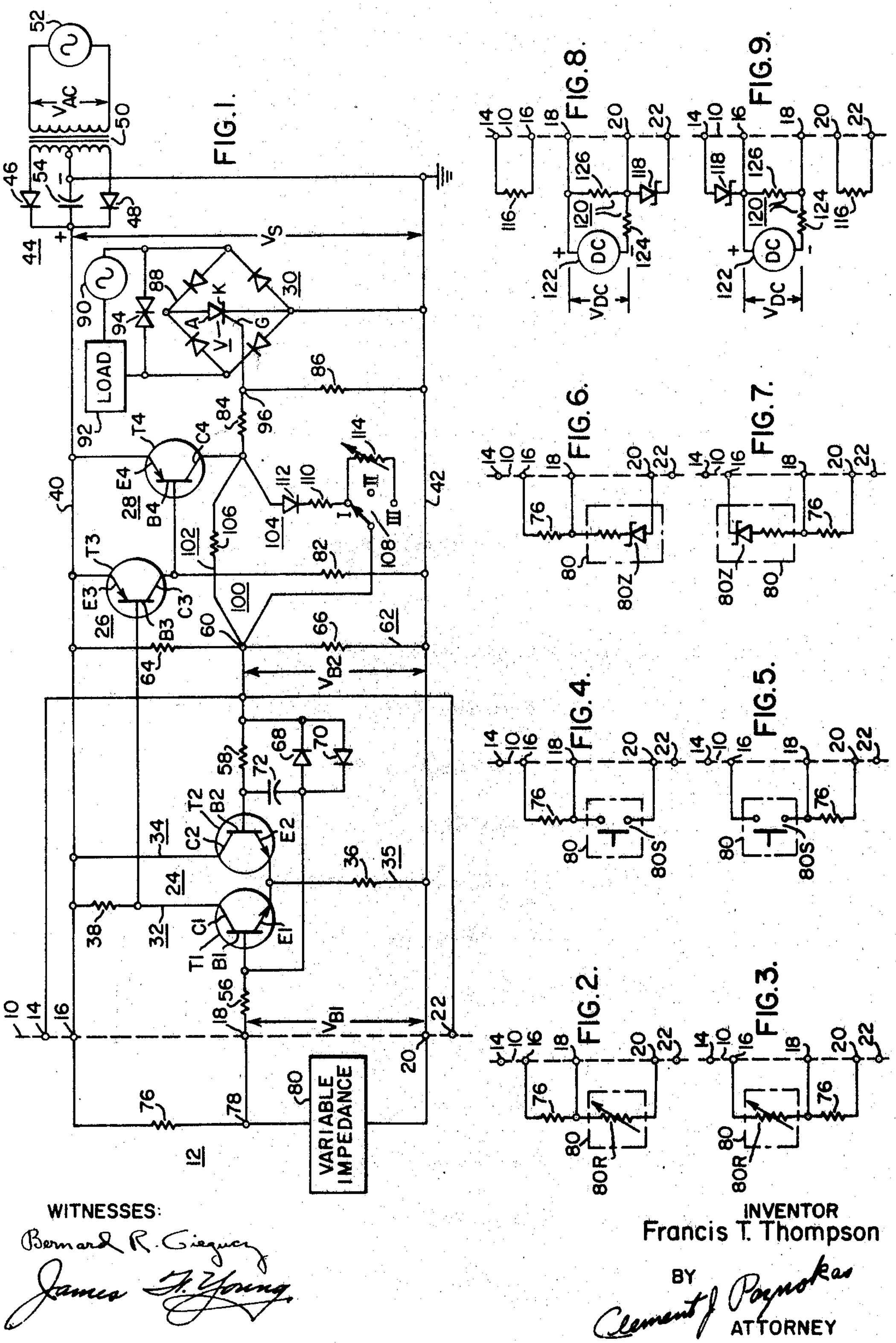
FIGURE 1 is a schematic diagram of a relay system embodying features of the invention.
FIGS. 2 to 8 are schematic diagrams illustrating modifications of input circuitry of the apparatus of FIG. 1 to provide set and reset signals in response to various conditions and current control devices.

In order to conveniently relate the various sensing arrangements in FIGS. 2 to 9, to the system of FIGURE 1, the circuit in FIGURE 1 is divided by a dashed line with the external sensing circuit 12 to the left thereof. Also for convenience, terminals for connection to various sensor arrangements are located along the dashed line 10. These terminals will be referred to as sensor terminals and are indicated at 14, 16, 18, 20, and 22. Aside from the sensing arrangement 12, the amplifying apparatus of FIG. 1 includes an input amplifier 24 that drives an intermediate amplifier 26 which in turn drives an output amplifier 28. The output status of amplifier 28 controls the status of a bilateral (symmetrical) switch 30.

In amplifier 24, there are two electron valves T1 and T2; in amplifier 26, an electron valve T3; and in amplifier 28, an electron valve T4. Each of these valves has a control electrode B, a first type main electrode C, a second type main electrode E, and an internal main current path extending through the valve from one to the other of the main electrodes. The term "first type main electrode" is adopted as a generic term covering collectors and anodes and other equivalent electrodes in transistors, electron tubes, and other electron valves. The term "second type main electrode" is adopted as a generic term covering emitters, cathodes and other equivalent electrodes in transistors, electron tubes, and other electron valves.

Although other suitable valves such as electron tubes may be employed, the valves are shown as transistors by way of example. The respective control and first type and second type main electrodes are related to transistors for example as follows. For a transistor connected in common emitter configuration or in common collector configuration, the base is the control electrode, the collector is the first type main electrode, the emitter is the second type main electrode, and the main current path is the collector-emitter current path. Thus, each of the transistors T has an emitter E, a collector C, and a base B. The reference letters T, E, C, and B for a particular valve have the same associative numerical suffix. For example, the reference characters T2, E2, C2, and B2 are associated with the same valve.

In amplifier 24, transistors T1 and T2, which are shown as n-p-n type by way of example, are connected in a differential amplifier configuration, wherein two parallel connected circuits 32 and 34 are connected in series with a path 35 having a resistor 36 that puts a constant current constraint on the path 35 and the parallel arrangement of circuits 32 and 34.

Circuit 32 includes the main power path of transistor T1 and a collector resistor 38. Circuit 34 includes the main power path of transistor T2. The series arrangement of path 35 and circuits 32 and 34 is connected across a pair of DC buses or supply lines 40 (positive) and 42 (negative) that are connected to the output of a DC power supply 44. DC source 44 is shown as a full wave center-tapped rectifier-transformer arrangement including a pair of half wave rectifiers 46 and 48 in circuit with the secondary winding of a transformer 50 whose primary winding is connected to a source of AC 52. A filter capacitor 54 is connected across the output of the DC source.

Although the operation of an emitter-coupled differential amplifier is well known, a brief review follows. In amplifier 24, the constant current of path 35 is divided between the paths 32 and 34 as a function of the difference between the voltages at bases B1 and B2. Operation of the amplifier is easier to understand if it is assumed that transistors T1 and T2 are equally conductive when there is no difference between the voltages on bases B1 and B2. Starting from this condition, if base B1 is made more negative than base B2, transistor T1 will be driven toward cutoff, thus forcing a greater share of the constant current to flow through transistor T2. On the other hand, if base B1 is driven more positive than base B2, transistor T1 will be driven toward full conduction thus diverting a substantial portion of the constant current away from branch 34 and into branch 32 whereby branch 32 receives a greater share of the constant current than branch 34.

Push-pull drive of transistors T1 and T2 in opposite directions may also be explained as follows. Due to the emitter resistor 36 being common to transistors T1 and T2, each of the transistors operates as an emitter follower (second type main electrode follower) driving the emitter of the other. As a result of this action, if transistor T1 is driven upward (increased conduction), the increased conduction through transistor T1 causes the emitter E2 to go more positive thereby to drive transistor T2 toward cut-off (downward). The converse takes place when transistor T1 is driven downward (decreased conduction). In the same manner, if the base drive on B2 is changed to drive transistor T2 upward, emitter follower action will drive transistor T1 downward toward cutoff, and vice versa. Although each transistor responds to the other, the action is so fast, that as a practical matter the inversely related drives of these transistors may be considered concurrent.

Base B1 is connected to terminal 18 through a resistor 56. Base B2 is connected through a resistor 58 to sensor terminals 14 and 22. It may also be noted at this time that terminals 16 and 20 are connected to the positive and negative buses 40 and 42 respectively. Base B2 is also connected through resistor 58 to an intermediate tap 60 of a voltage divider 62 connected across supply lines 40 and 42 including resistors 64 and 66. Protection for the base-emitter junctions of transistors T1 and T2 is provided by resistors 56 and 58 and diodes 68 and 70. A capacitor 72 rejects noise to prevent operation of the amplifier by spurious signals.

The external sensing circuit 12 includes an impedance 76 having one end connected to terminal 16 and the other end connected through a junction 78 to one end of a sensing device 80 whose other end is connected to terminal 20. Junction 78 is connected to terminal 18. In FIG. 1, sensor 80 is shown by way of example as a variable impedance which varies in response to a condition. The condition responsive variable impedance 80 may for example be of a type that varies gradually in response to a varying condition, for instance a temperature sensitive resistor (thermistor, etc.), or a rheostat whose resistance varies in response to position of a wiper contact. The condition variable impedance 80 may also for example be of a type that varies abruptly from high to low impedance states in response to a change in a condition, for instance, switching devices such as voltage threshold devices (Zener diodes or other), and switch contacts that are closed and opened in response to mechanical movement thereof.

Transistor T3 of amplifier 26, shown by way of example as a p-n-p type, is driven from the output circuit of transistor T1 means of a coupling from collector C1 to base B3. A collector resistor 82 is connected from collector C3 to the negative bus 42. Emitter E3 is connected to the positive bus 40. Transistor T3 is arranged to turn ON and turn OFF in response to turn-ON and turn-OFF respectively, of transistor T1.

Transistor T4 of amplifier 28, shown as a p-n-p type by way of example, is driven by transistor T3 through a connection from collector C3 to base B4. Emitter E4 is connected to the positive bus while the collector C4 is connected to the negative bus 42 through collector load resistor 84 and 86. The output of transistor T4 drives a load G for example the control element of bilateral switch 30.

The symmetrical switch 30 is shown by way of example as including a full wave rectifier bridge 88 with its AC input terminals connected in series between an AC source 90 and a load 92, and its DC output terminals connectable together through the internal main current path of a controllable electric valve V for example a solid state valve, operating in the switching mode. Valve V is provided with a control electrode G, and main electrodes A and K, the latter two electrodes being connected to the DC terminals of bridge 88. Valve V may for example be a controlled rectifier of tube type, solid state type, or other. Thyratrons are well known tube type controlled rectifiers, while thyristors are well known solid state controlled rectifiers. Valve V is shown by way of example as a thyristor with A being the anode, G being the gate and K being the cathode. A bilateral breakover device 94 is connected across the AC terminals of bridge 88 in order to prevent two-terminal or anode breakover operation of thyristor V.

Gate G is driven by amplifier 28 through a connection to a junction 96 between load resistors 84 and 86 in the output circuit of transistor T4. Switch 30 is turned ON when valve V is turned ON, and vice versa. Valve V is OFF when transistor T4 is OFF, and valve V is turned ON in response to turn-ON of transistor T4. The relationship between amplifiers 26 and 28 is such that transistor T4 is turned OFF in response to turn-ON of transistor T3, and transistor T4 is turned ON in response to turn-OFF of transistor T3.

The apparatus is in one state of operation, which for convenience may be referred to as the "set state," when transistor T4 is ON. Under these conditions transistor T1 is OFF, transistor T2 is ON, transistor T3 is OFF, and valve V is ON. This example of "set state" may be likened to the "pulled-in" or "picked-up" state of a relay. On the other hand, when the modes of transistors T1, T2, T3 and T4 are the reverse of the above conditions, the apparatus is in a second state of operation which may be referred to as the reset state. This state may be likened to the "dropped-out" state of a relay.

To provide snap action on set and reset, and to render the apparatus stable in the set state of operation a latch circuit 100 provides regenerative feedback from the output circuit of amplifier 28 to amplifier 24 through the input circuit of transistor T2. Feedback circuit 100 includes two parallel feedback paths 102 and 104. Feedback path 102 includes a resistor 106 connected between the collector C4 and junction 60. Feedback path 104, also connected between collector C4 and junction 60, includes a three position switch 108, and the particular makeup of the feedback path 104 at any given time is dependent on the position of the switch. When switch 108 is in position I (illustrated position), feedback circuit 104 includes in series a resistor 110 and an asymmetric device 112 such as a diode. With switch 108 in position II, the feedback path 104 has infinite impedance (open-circuited). When switch 108 is in position III, the feedback circuit 104 includes in series the resistor 110, the diode 112, and a resistor 114, which for convenience may be made variable.

By way of example, the components of the circuit of FIG. 1 may be of the following values and types:

Transistors T1, T2—Type 2N1711
Transistors T3, T4—Type 2N3638
Thyristor V—Type MCR 1305-4
Diodes 68, 70, 112—Type 1N457
Diodes in bridges 88—Type 1N1222
Diodes 46, 48—Type 1N645
Zener diode—1N748A
Surge suppressor 94—Westinghouse Voltrap Suppressor CR10
Capacitor 72—.01 mfd.
Resistor 36—3.9 kilohms
Resistor 38—4.7 kilohms
Resistor 56, 58—Each 560 ohms
Resistor 64, 66, 110—Each 1.0 kilohms
Resistor 82—2.2 kilohms
Resistor 84—300 ohms
Resistor 86—150 ohms
Resistor 106—120 kilohms
Voltage $V_s$—16 volts The apparatus in FIGURE 1 is arranged to operate in the above-described respective set and reset modes in response to two mutually exclusive operating conditions: (1) voltage applied to base B1 more negative than voltage applied to base B2, and (2) voltage on base B1 more positive than the voltage on base B2. When the voltage on base B1 is more positive than the voltage on base B2 transistor T1 will be ON, transistor T2 will be OFF, transistor T3 will be ON, and transistor T4 will be OFF, providing the above-described reset mode of the apparatus. On the other hand, when the voltage on base B1 is more negative than the voltage on base B2, transistor T1 will be OFF, transistor T2 will be ON, transistor T3 will be OFF, and transistor T4 will be ON, thereby providing the above referred to mode of the apparatus.

Voltage $V_S$ is the DC voltage supplied across lines 40 and 42 by the DC source 44. The voltage on base B1 is determined by and may be represented by the voltage $V_{B1}$ across terminals 18–20. The voltage on base B2 is determined by and may be represented by voltage $V_{B2}$ between the junction 60 and the negative bus 42. Voltage $V_{B1}$ is determined by the relative values of impedances 76 and 80 of sensing network 12 which is connected across the DC buses 40 and 42. Voltage $V_{B2}$ as one value when transistor T4 is OFF, and a more positive value when transistor T4 is ON. When transistor T4 is OFF, voltage $V_{B2}$ is determined by the voltage dividing arrangement connected across lines 40 and 42 wherein resistor 64 is in series with a parallel arrangement including resistor 66 connected in parallel with a series string including resistors 106, 84 and 86. Employing the exemplary resistance values given in the above tables, when transistor T4 is OFF, the voltage $V_{B2}$ will be about 49.8% of the voltage $V_S$. As described above, transistor T4 is OFF in the dropped-out or reset mode of the apparatus.

On the other hand, when transistor T4 is ON (as it is in the picked-up or set mode of the apparatus), current flowing through the main power path of transistor T4 becomes an additional factor in determining the voltage $V_{B2}$, which, with switch 108 in position I and with the resistor values of the above table, is about 65% of of the DC supply voltage $V_S$. With transistor T4 ON and switch 108 in position II (path 104 open circuited), the voltage $V_{B2}$ becomes about 50.2% of the DC supply voltage $V_S$ due to the high impedance of resistor 106 no longer being shunted by resistor 110. With transistor T4 OFF and switch 108 in position III, the value of voltage $V_{B2}$ is some value between 50.2% and 65% of the supply voltage $V_S$, depending on the resistance value of resistance 114.

It should be noted from the above that when transistor T4 is ON (picked-up or set state of aparatus), voltage $V_{B2}$ may be varied by varying the resistance of feedback path 104. In the example, the resistance of path 104 may be varied from infinity (open circuit) to the value of resistor 110 by different combinations of switch 108 and adjustments of resistance 114. However, varying the resistance of feedback path 104 has no effect on on voltage $V_{B2}$ when transistor T4 is OFF (reset mode of aparatus), since current from line 40 through resistor 64 cannot flow through path 104 because of the diode 112, which is poled to oppose current flow in the direction from resistor 64 toward line 42. If the polarity of diode 112 is reversed, changing the resistance value of the path 104 will alter the value of voltage $V_{B2}$ which occurs when transistor T4 is OFF, without affecting the value of voltage $V_{B2}$ that occurs when transistor T4 is ON.

With diode 112 poled as shown in FIG. 1, path 104 is conductive when value T4 is ON, and non-conductive when that valve is OFF. On the other hand when the polarity of diode 112 is reversed, path 104 is conductive when valve T4 is OFF and non-conductive when that valve is ON.

Operation of the apparatus is most easily explained and comprehended in connection with a sensing configuration wherein the sensor 80 is a continuously variable impedance such as a rheostat or a temperature sensitive resistor. For example, assume that the sensing network 12 in FIG. 1 is modified as in FIG. 2 with the variable impedance 80 being a rheostat 80R whose resistance varies in response to a condition, such as position of the rheostat arm. Further assume that switch 108 is in position II (resistance of path 104 is infinity), that the resistance of impedance 80 is such that the voltage $V_{B1}$ is about 51% of voltage $V_S$, and that the apparatus is in the dropped-out state. Under these conditions, transistor T4 is not conducting, valve V and switch 30 are OFF, and voltage $V_{B2}$ is about 49.8% of voltage $V_S$. Also under these conditions transistor T1 will be ON, transistor T2 will be OFF, and transistor T3 will be ON.

Now suppose that the position of the contact wiper of rheostat 80R is moved to decrease the resistance of the rheostat, thereby making voltage $V_{B1}$ more negative than voltage $V_{B2}$ and below the pull-in voltage or set point of the apparatus which for example may be 49.8% of voltage $V_S$. Transistor T1 starts to turn OFF to start turn ON of transistor T2 through emitter follower coupling, and to start turn-OFF of transistor T3. This causes transistor 14 to start turning ON providing positive feedback through feedback path 102 to base B2 of transistor T2 speeding transistor T2 to a higher conduction level. In turn, through emitter follower coupling, transistor T1 is accelerated toward cutoff thereby accelerating transistor T3 toward cutoff and transistor T4 toward full turn ON. The resulting cumulative action due to the regenerative feedback provides snap action in switching from drop-out mode to the pull-in or pickup mode. In response to full turn-ON of transistor T4, the gate G of valve V is forward biased to turn ON valve V and switch 30, thus to connect the AC power source 90 to the load 92. The regenerative feedback also latches the apparatus in the picked-up or set mode.

Since the high resistance feedback path 102 is the only feedback path in the circuit with switch 108 at position II, voltage $V_{B2}$ will be a relatively high percentage of voltage $V_S$, for example about 50.2%.

To reset or drop out the apparatus, voltage $V_{B1}$ must be made more positive than voltage $V_{B2}$, for example $V_{B1}$ should be raised to about 50.3% of voltage $V_S$ by adjusting the arm of rheostat 80R to increase the value of its resistance. When this is effected, and the voltage $V_{B1}$ is made more positive than voltage $V_{B2}$, the reverse of the above action through the transistors takes place. Transistor T1 begins to turn-ON, transistor T2 is driven toward cutoff, transistor T3 starts to turn-ON, and transistor T4 starts to turn-OFF. Again, the regenerative feedback circuit, due to dropping feedback current, accelerates turn-ON of transistor T1, turn-OFF of transistor T2, turn-ON of transistor T3, and turn-OFF of transistor T4. Of course, with turn-OFF of transistor T4, valve V and switch 30 are also turned OFF, disconnecting load 92 from the power supply 90.

If a higher drop-out voltage or reset point is desired, switch 108 is moved to position I or position III, thereby bringing into service the second feedback path 104 having considerably lower resistance than feedback path 102. This increases the voltage $V_{B2}$ when valve T4 is ON. From the above description, it is readily seen that the hysteresis (difference between pick-up and drop-out voltages) may be adjusted as desired by adjusting the drop-out voltage through modification of feedback path 104 without affecting the set point, that is, independently of the pick-up voltage value.

From the above, it should be apparent that the positions of impedances 76 and 80 may be interchanged so that the variable impedance 80 is connected across terminals 16 and 18. In such case the resistance of impedance 80 is varied in the inverse or opposite direction to provide the same effects. It should also be seen from the above description that if in the circuit of FIGURE 1 as modified by FIG. 2, impedance 80R is an NTC (negative temperature coefficient) resistor, that the apparatus will be picked up and switch 30 closed above a predetermined temperature. The same result can be had by employing the circuit of FIG. 3 with a PTC (positive temperature coefficient) resistor at 80R. By employing an NTC resistor at 80R in the circuit of FIG. 3, the apparatus will be pulled in and switch 30 closed below a given temperature.

With the sensing circuit 12 in FIGURE 1 modified as in FIG. 4, wherein the variable impedance 80 is a switch 80S whose impedance abruptly is changeable from one to the other of zero and infinity, the apparatus will be picked-up and the switch 30 closed when the switch 80S is closed. With the elements in reverse positions as in FIG. 5, the apparatus drops out (reset) and switch 30 opens when the switch 80S is closed.

In FIG. 6, the sensing network 12 is shown with a voltage threshold device 80Z such as a Zener diode employed as switch type abruptly changing impedance 80. Employing this modification with the apparatus of FIG. 1, the apparatus will be set or picked up and switch 30 closed when the voltage $V_{AC}$ exceeds a given value. It should be noted that $V_{AC}$ is the voltage of AC source 52. With the impedances 76 and 80 reversed as in FIG. 7, the apparatus will be set or picked up and AC switch 88 closed when the input voltage $V_{AC}$ falls below a given value.

Employing the modification of FIG. 8 in place of a sensing network 12 in FIG. 1, a resistor 116 of about the same value as resistor 64 is connected across terminals 14 and 16 and thereby between junction 60 and positive bus lead 40. A voltage threshold device 118 such as a Zener diode is connected across terminals 20 and 22 and thereby between junction 60 and the negative bus 42. By means of a voltage divider 120, a voltage $V_{DC}$ derived from a DC source 122 is applied across terminals 18 and 20. The voltage divider 120 is made up of resistors 124 and 126. Employing the modification of FIG. 8, in connection with the apparatus in FIG. 1, the apparatus will be set or picked-up and switch 30 closed when the input voltage $V_{DC}$ falls below a preset value, for example, about 5.5 volts if the Zener diode 118 has a 5.6 Zener voltage. With the elements reversed as in FIG. 9, the apparatus will be picked up and switch 30 closed when the input voltage $V_{DC}$ rises above a preset value.

It is to be understood that the herein described arrangements are simply illustrative of the principles of the invention, and that other embodiments and applications are within the spirit and scope of the invention.

I claim as my invention:

1. Electric apparatus selectively operable in either of two stable output states, said apparatus comprising first electronic amplifier means having input circuit means and output circuit means and operable to respective first and second output modes in response to respective first and second operating conditions imposed on the first amplifier means, second electronic amplifier means having input circuit means and output circuit means and operable to respective first and second stable output modes in response to the first and second output modes respectively of the first amplifier means, load means controlled by the output of the second amplifier means, said load means assuming one state in response to the second amplifier means changing from its first to its second output mode and a second state in response to the second amplifier means changing from its second to its first output mode, and regenerative feedback means connected from the output circuit means of the second amplifier means to the first amplifier means for supplying regenerative feedback from the second to the first amplifier means, said feedback means including first and second parallel current paths, the first current path being bidirectionally conductive and including first resistance means, the second current path being asymmetrically conductive and including second resistance means, said asymmetrically conductive path being conductive when the second amplifier means is in one of its modes, and non-conducting when the second amplifier means is in its other mode.

2. The combination of claim 1 wherein there is switch means for opening and closing said asymmetric current path as desired.

3. The combination of claim 1 wherein said second resistance means is variable.

4. The combination of claim 1 wherein: said first amplifier means includes an electronic valve having a control electrode; there is bias means for said electronic valve which includes a voltage divider having an intermediate tap and means connecting said tap to said control electrode; and said parallel current paths are connected between said tap and the output circuit means of said second amplifier means.

5. The combination as in claim 1 wherein said load means comprises a controllable electric valve operating in switching mode.

6. The combination of claim 1 wherein said first amplifier means includes a first electron valve, said second amplifier means includes a second electron valve, each valve having a pair of main electrodes, a control electrode, and an internal main current path extending from one to the other of the main electrodes, and which combination further includes respective positive and negative power supply lines, means for connecting one of the main electrodes of the second valve to one of said supply lines and means including third resistance means for connecting the other main electrode of the second valve to the other supply line, a junction, fourth resistance means connected between said junction and one of said supply lines, fifth resistance means connected between said junction and the other supply line, means connecting said junction to the control electrode of the first valve, and means connecting said parallel current paths between the control electrode of the first valve and said other main electrode of the second valve.

7. The combination as in claim 6 wherein said asymmetric current path includes current control means.

8. The combination as in claim 7 wherein said current control means comprises switch means for opening and closing, as desired, said asymmetric current path.

9. The combination as in claim 7 wherein said current control means comprises means for varying the resistance value of said asymmetric current path.

10. The combination as in claim 6 wherein the first amplifier means includes a third electron valve having a pair of main electrodes, a control electrode and an internal main power path extending from one to the other of its main electrodes, the first and third valves being connected in differential amplifier configuration wherein a main electrode of the first valve is coupled to the like main electrode of the third valve to provide main electrode follower coupling whereby the first and third valves are drivable by each other through mutually coupled main electrodes, and wherein said first and second operating conditions are voltage differences between the control electrodes of said first and third valves in one and the opposite direction respectively, and said first mode of the first amplifier is relatively high conductivity for one of said first and third valves and low conductivity for the other, and vice versa for said second mode of the first amplifier means.

11. The combination of claim 10 wherein said first and third valves are transistors, the pair of main electrodes of each transistor are its emitter and collector, the control electrode of each transistor is its base, the main electrode follower coupled differential amplifier configuration is emitter follower coupled differential amplifier configuration, and wherein said first and second operating condition are voltage differences between the bases of said transistors in one and the opposite direction respectively, and said first mode of the first amplifier means is relatively high conductivity for one transistor and low conductivity for the other, and vice versa for said second mode of the first amplifier means.

12. The combination of claim 10 which further includes first circuit means for providing said first and second operating conditions.

13. The combination of claim 12 wherein said first circuit means includes voltage threshold means connected between one of said supply lines and the control electrode of one of said first and third valves.

14. The combination of claim 12 wherein said first circuit means includes sixth resistance means connected between the control electrode of the third valve and one of said supply lines, and current control means connected between the control electrode of the third valve and the other of said supply lines.

15. The combination of claim 14 wherein said current control means comprises variable resistance means.

16. The combination of claim 15 wherein said variable resistance means is variable in response to variation of a condition.

17. The combination of claim 14 wherein said current control means comprises switch means.

18. Electrical apparatus selectively operable in either of two stable output states comprising: a pair of supply lines for connection to a D.C. source; first amplifier means having input circuit means and output circuit means and operable in respective first and second output modes in response to respective first and second operating conditions imposed on the first amplifier means, said first amplifier means having first and second electron valves, each valve having a pair of main electrodes, a control electrode, and an internal main current path extending from one to the other of the main electrodes, said valves being connected in differential amplifier configuration wherein a main electrode of the first valve is coupled to the like main electrode of the second valve to provide main electrode follower coupling whereby the valves are drivable by each other; second amplifier means having input circuit means and output circuit means and operable in respective first and second stable output modes in response to the first and second output modes respectively of the first amplifier means; load means controlled by the output of the second amplifier means, said load means assuming one state in response to the second amplifier means changing from its first to its second output mode, and a second state in response to the second amplifier means changing from its second to its first output mode; regenerative feedback means connected from the output circuit means of the second amplifier means to one of said control electrodes; and circuit means for providing said first and second operating conditions for the first amplifier means, the latter circuit means comprising first resistance means connected between the control electrode of said first valve and a first of said supply lines, second resistance means connected between the control lectrode of said first valve and the second of said supply lines, and switch means connected between the control electrode of one of said valves and one of said supply lines.

19. The combination of claim 18 wherein said load means comprises switching means.

20. The combination of claim 18 wherein said valves are transistors, the pair of main electrodes of each transistor are its emitter and collector, said control electrode of each transistor is its base, the main electrode follower coupled differential amplifier configuration is emitter follower coupled differential amplifier configuration, and wherein said first and second operating conditions are voltage differences between the base of said transistors in one and the opposite direction respectively, and said first mode of the first amplifier means is relatively high conductivity for one transistor and low conductivity for the other, and vice versa for said second mode of the first amplifier means.

21. The combination of claim 18 wherein said switch means is voltage threshold means.

22. The combination of claim 18 wherein said one supply line is said first supply line, said one valve is said second valve, and there is third resistance means connected between said second supply line and the control electrode of said second valve.

References Cited

UNITED STATES PATENTS

| | | | |
|---|---|---|---|
| 3,036,224 | 5/1962 | Abraham | 330—110 XR |
| 3,136,877 | 6/1964 | Heller | 219—499 |
| 3,144,564 | 8/1964 | Sikorra | 328—150 XR |
| 3,159,737 | 12/1964 | Dora | 328—209 XR |
| 3,260,854 | 7/1966 | Krishnaswamy | 328—1 XR |
| 3,316,423 | 4/1967 | Hull | 307—289 |
| 3,435,252 | 3/1969 | Eubanks | 328—172 XR |

JOHN S. HEYMAN, Primary Examiner

STANLEY T. KRAWCZEWICZ, Assistant Examiner

U.S. Cl. X.R.

219—499; 307—235, 252, 289, 308; 317—148.5, 149; 328—89, 172, 208, 209; 330—99